United States Patent [19]
Takei

[11] Patent Number: 5,302,873
[45] Date of Patent: Apr. 12, 1994

[54] LINEAR PULSE MOTOR HAVING A HIGH RESOLUTION

[75] Inventor: Seiji Takei, Yokohama, Japan

[73] Assignee: Nippon Thompson Co., Ltd., Tokyo, Japan

[21] Appl. No.: 997,274

[22] Filed: Dec. 23, 1992

[30] Foreign Application Priority Data

Dec. 24, 1991 [JP] Japan .................................. 3-355624

[51] Int. Cl.⁵ ............................................ H02K 41/00
[52] U.S. Cl. ................................................... 310/12
[58] Field of Search .......................................... 310/12

[56] References Cited

FOREIGN PATENT DOCUMENTS

61-42268 7/1986 Japan .

Primary Examiner—Steven L. Stephan
Assistant Examiner—Judson H. Jones
Attorney, Agent, or Firm—Skjerven, Morrill, MacPherson, Franklin & Friel

[57] ABSTRACT

A linear pulse motor includes a primary side unit and a secondary side unit. The primary side unit includes a permanent magnet and at least two electromagnets, each formed with at least one projecting magnetic pole portion. One of the electromagnets is fixedly mounted on a table while the other electromagnet is slidably mounted on the table. The primary side unit also includes a spacing adjusting element, such as a piezoelectric element, interposed between the two electromagnets so as to adjust the spacing between the two electromagnets. The secondary side unit includes a plurality of inductor teeth arranged in a row at a predetermined pitch.

6 Claims, 10 Drawing Sheets

LINEAR PULSE MOTOR HAVING A HIGH RESOLUTION

BACKGROUND OF THE INVENTION

1. Field of the Invention

This invention generally relates to a magnetic positioning device for use in positioning an object in various machines such as machine tools and industrial robots, and, in particular, to a linear pulse motor for positioning an object at high accuracy. This invention also relates to a linear motion unit including such a linear pulse motor and a guide mechanism associated therewith.

2. Description of the Prior Art

Figure 11:
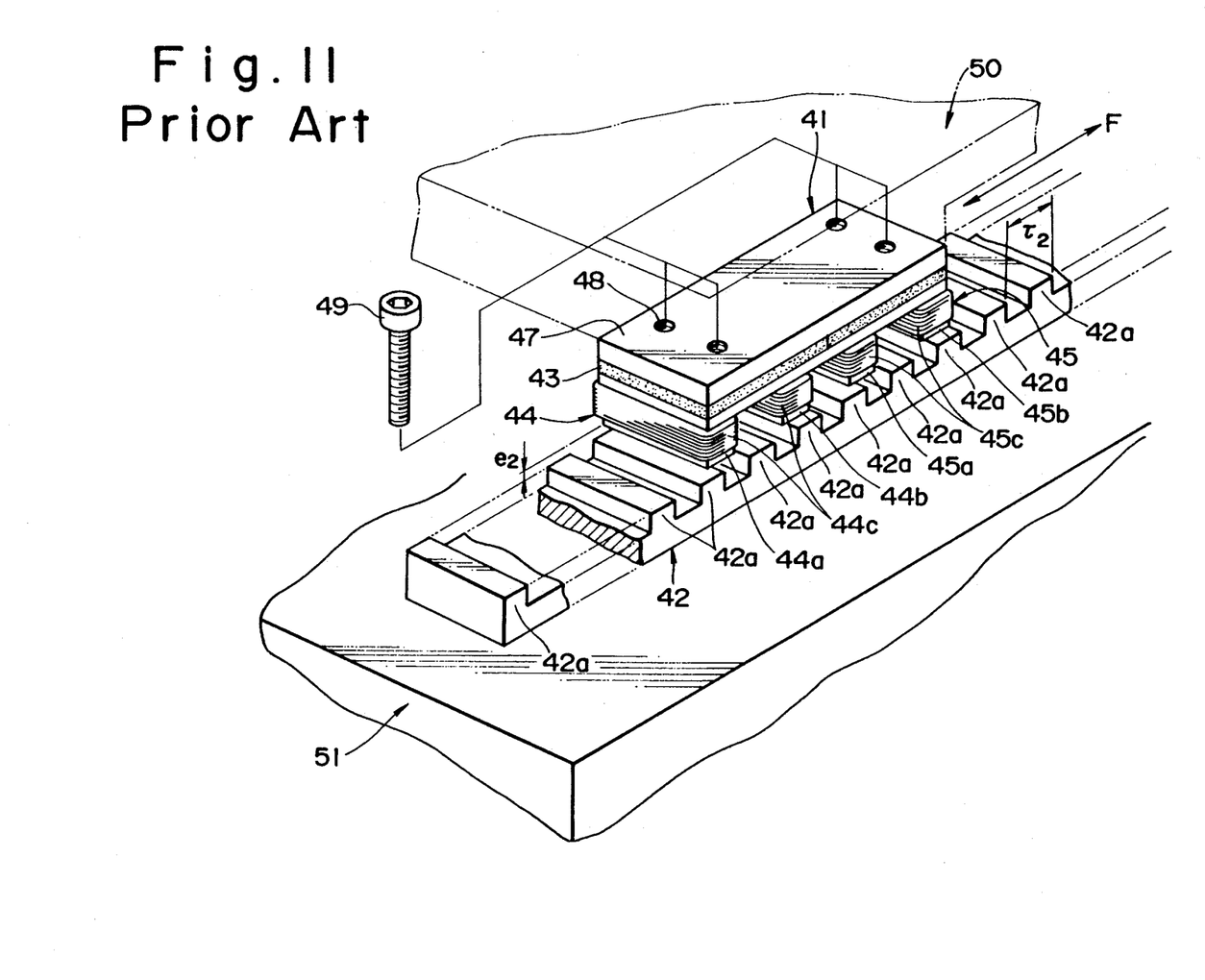
FIG. 11 is a schematic illustration showing in perspective view a prior art linear pulse motor.

A linear pulse motor or linear motion unit for use in positioning an object along a straight line is well known in the art and a typical prior art linear pulse motor is illustrated in FIG. 11. The motor shown in FIG. 11 is of the two phase excitation type and it includes a primary side unit 41 for supplying a displacing pulse signal and a secondary side unit 42 for generating a thrust in cooperation with the primary side unit 41. The primary side unit 41 includes a permanent magnet 43 formed in the shape of a rectangular plate and a pair of electromagnets 44 and 45 coupled to the bottom surface of permanent magnet 43 at opposite ends thereof. The electromagnets 44 and 45 include iron cores whose pole portions 44a, 44b and 45a, 45b extend downwardly, whereby the bottom end portions of these pole portions serve as inductor teeth. Coils 44c and 45c are wound around the respective iron cores. A back plate 47 of a material having a high permeability is fixedly attached to the top surface of the permanent magnet 44. A plurality of threaded holes 48 are provided extending through the back plate 47 and the permanent magnet 43, and bolts (not shown) may be threaded into these holes 48 to have the primary side unit 41 fixedly mounted on a table 50.

Regarding the secondary side unit 42, it is generally in the shape of an elongated, rectangular plate having a high permeability and provided with a number of inductor teeth 42a arranged at a predetermined pitch $\tau_2$, each extending in the transverse direction with respect to the longitudinal axis of the secondary side unit 42. The secondary side unit 42 is typically fixedly mounted on a bed 51 of a machine tool or the like, for example, by means of bolts (not shown).

The primary and secondary side units 41 and 42 are arranged such that their respective inductor teeth are in an opposed and spaced-apart relationship. Although not shown specifically in the drawings, there is typically provided a guide means for guiding the primary side unit 41 relative to the secondary side unit 42 with a predetermined gap therebetween (indicated by $e_2$ in FIG. 11) such that a relative linear motion may be produced between the primary and secondary side units 41 and 42. A linear motion unit may be created by combining such a guide means with the above-described linear pulse motor.

In the above-described example, a single linear pulse motor is mounted on the bed 51 with its primary side unit 41 carrying the table 50. With this structure, an object (not shown) may be carried on the table 50 as fixedly attached thereto for positioning at a desired location since the table 50 may move back and forth in either direction as indicated by the double arrow F. Alternatively, two or more such linear pulse motors may be provided in a line or in a side-by-side relationship, if desired.

Now, also referring to FIGS. 12 through 15, a description will be had with respect to the operation of a linear motion unit including a linear pulse motor having the above-described structure. Since the principle of operation of the linear pulse motor itself is well known in the art, its detailed description will not be repeated here. It is to be noted that reference characters 52 through 59 have been used in FIGS. 12 through 15 just for the sake of convenience and they are all part of the inductor teeth 42a of the secondary side unit 42. In addition, in FIGS. 12 through 15, reference characters S and N indicated above and below the permanent magnet 43, respectively, indicate the magnetic polarities of the permanent magnet 43.

As a brief summary of the principle of operation of a linear pulse motor of the above-described permanent magnet type (or PM type), the magnetic interactive force between the opposed teeth is determined by a combination of a magnetic field produced by the permanent magnet and another magnetic field produced by the electromagnets and the table 50 takes a position where these magnetic interactive forces are balanced. When the energization state of the electromagnets is varied, the magnetic field produced by the electromagnet changes, which, in turn, changes the magnetic interactive forces to thereby apply a thrust to the table 50.

Figure 12:
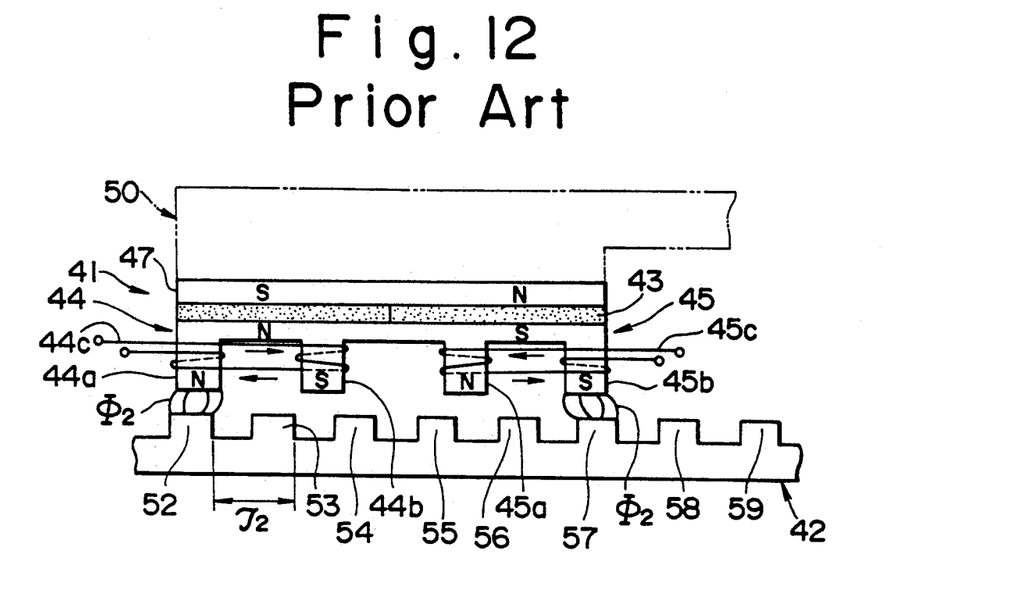
FIGS. 12-15 are schematic illustrations useful for explaining the principle of operation of the prior art structure shown in FIG. 11.

That is, assuming that FIG. 12 illustrates the initial balanced condition with current flowing through coils 44c and 45c of the electromagnets 44 and 45 of the primary side unit 41 as indicated by the arrows, respectively, a strong magnetic flux $\Phi_2$, which is a combination between a magnetic flux due to the permanent magnet 43 and another magnetic flux due to each of the coils 44c and 45c, is present between each of the magnetic pole portions 44a and 45b and a corresponding one of the inductor teeth 52 and 57 of the secondary side unit 42. On the other hand, a weak magnetic flux is present between each of the remaining magnetic pole portions 44b and 45a of these electromagnets 44 and 45 and an adjacent inductor tooth of the secondary side unit 42 since a subtractive relationship is present between the magnetic flux due to the permanent magnet 43 and the magnetic fluxes due to the coils 44c and 45c there. It may be so set that the magnetic flux due to the permanent magnet 43 and each of the magnetic fluxes due to the coils 44c and 45c cancel each other.

Figure 13:
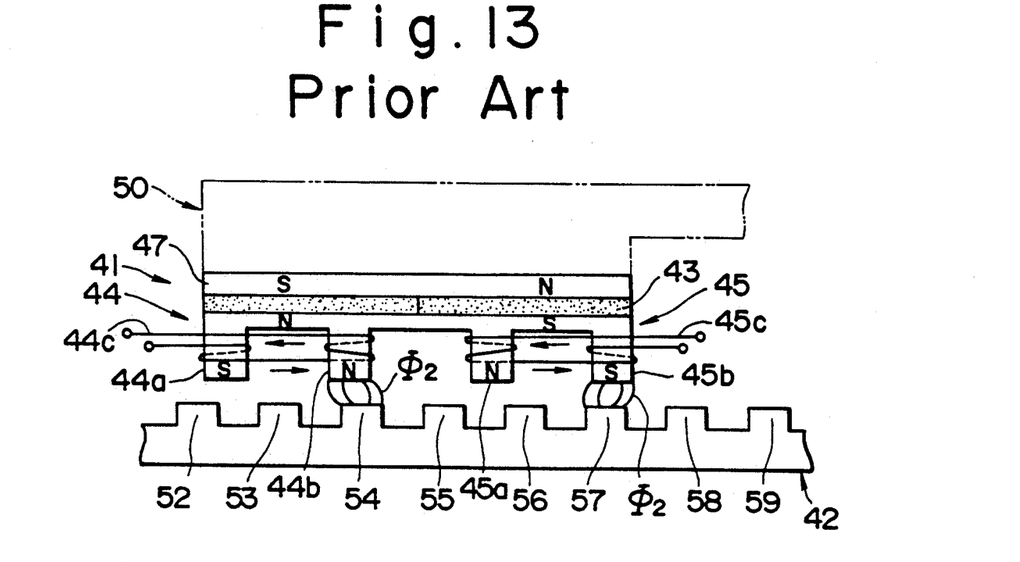

Now, let us assume that the current flowing through the coil 44c of electromagnet 44 has been reversed and thus the magnetic polarities of electromagnet 44 have been reversed as shown in FIG. 13. Then, a strong magnetic flux $\Phi_2$ is now present between the magnetic pole portion 44b of electromagnet 44 and an adjacent inductor tooth 54 of secondary side unit 42 while the magnetic flux $\Phi_2$ which existed between the magnetic pole portion 44a and the inductor tooth 54 in the initial condition has disappeared. As a result, an attractive force between the magnetic pole portion 44b, together with an attractive force due to the strong magnetic flux $\Phi_2$ present between the magnetic pole portion 45b of electromagnet 45 and the inductor tooth 57, causes the primary side unit 41, and thus table 50, to move over a distance corresponding to ¼ of pitch $\tau_2$ of inductor teeth.

Figure 14:
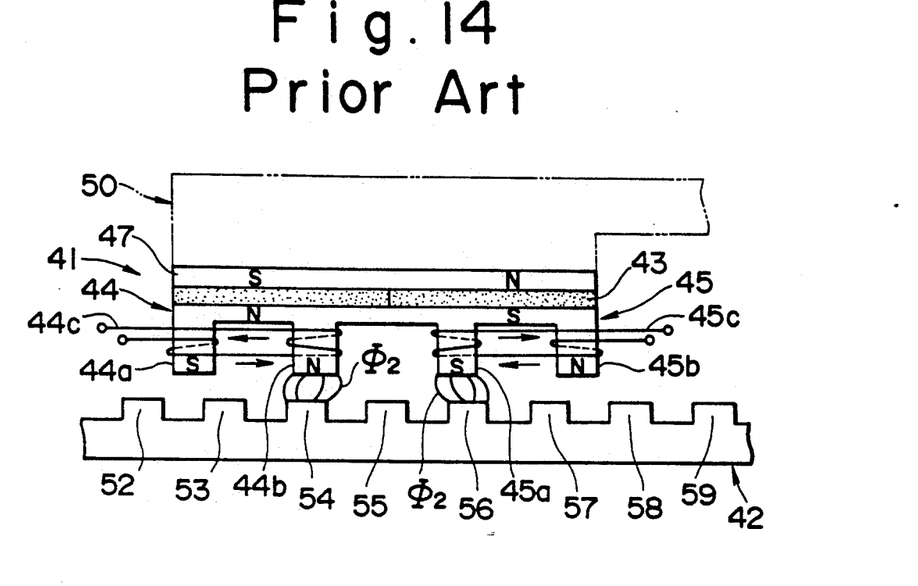

Then, as shown in FIG. 14, the current flowing in the coil 45c of electromagnet 45 has been reversed in direction so that the magnetic polarities of electromagnet 45 has been reversed. Thus, a strong magnetic flux $\Phi_2$ is now present between the magnetic pole portion 45a of electromagnet 45 and its adjacent inductor tooth 56 of secondary side unit 42 and the magnetic flux which was present between the other magnetic pole portion 45b and the inductor tooth 57 disappears. Therefore, an attractive force is produced between each of the magnetic pole portions 44b and 45a and a corresponding one of the inductor teeth 54 and 56 so that the table 50 is again caused to move over a distance corresponding to ¼ of pitch $\tau_2$.

Figure 15:
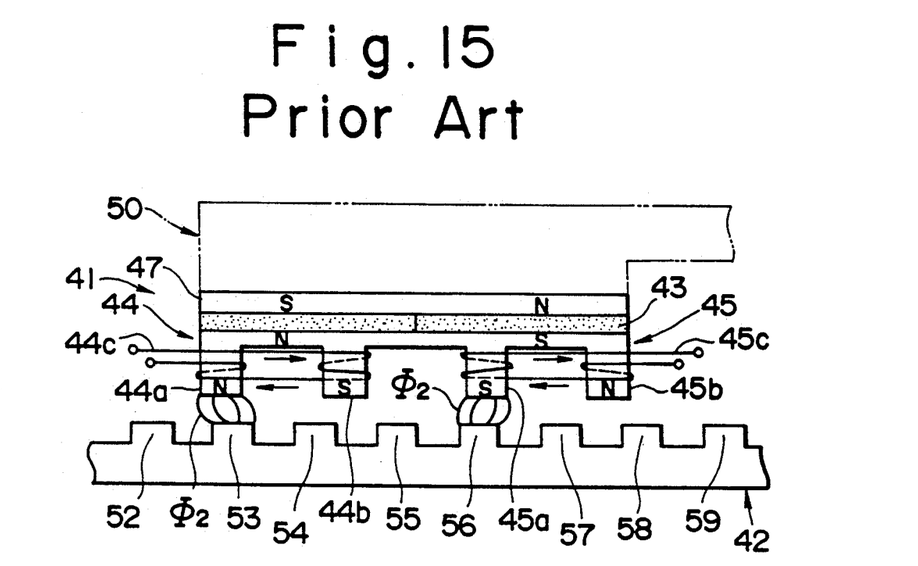

Then, as shown in FIG. 15, the direction of the current flowing in the coil 44c of electromagnet 44 is again reversed so that a strong magnetic flux $\Phi_2$ is now present between the magnetic pole portion 44a of electromagnet 44 and its adjacent inductor tooth 53 of secondary side unit 42; on the other hand, the strong magnetic flux which existed between the other magnetic pole portion 44b and its adjacent inductor tooth 54 disappears. As a result, an attractive force is now effective between each of the magnetic pole portions 44a and 45a and a corresponding one of inductor teeth 53 and 56 so that the table 50 is caused to move over a distance corresponding to ¼ of the pitch. Thereafter, the current flowing each of the coils 44c and 45c of the respective electromagnets 44 and 45 is set in the condition shown in FIG. 12, and, therefore, the table 50 is again caused to move over a distance corresponding to ¼ of the pitch. As a result, the table 50 comes to be shifted in position over a distance corresponding to a single pitch $\tau_2$.

In this manner, the above-described operation is repeated over a desired number of times so that the table 50 comes to be positioned at a desired location. Although the table 50 has been shifted to the right in the above-described example, the table 50, of course, may move to the left. Besides, although the primary and secondary side units 41 and 42 have been set as moving and stationary sides, respectively, in the above-described example, the primary side unit 41 may be set as a stationary side with the secondary side unit 42 as the moving side.

The resolution of the above-described linear pulse motor, i.e., the pulse pitch traversed by the primary side unit 41 per single pulse signal applied, is determined by dividing the pitch $\tau_2$ of the inductor teeth 42a of secondary side unit 42 by the number of excitation modes of the coil. Thus, the following three approaches are conveniently and mainly adopted so as to obtain an increased resolution.

(1) Reducing pitch $\tau_2$ by increasing the manufacturing accuracy at the primary and secondary side units;
(2) Increasing the number of excitation modes of the coil by adopting a multi-phase excitation method; and
(3) Adopting the so-called microstep scheme wherein the excitation electromagnetic current of the coil is subdivided to adjust the magnetic force finely, thereby finely varying the position of magnetic balanced location.

However, there is a limit in the improvement of resolution even in any of the above-described schemes were adopted, and there still remains a need to provide an improved resolution on the order of 1 micron or submicrons.

SUMMARY OF THE INVENTION

In accordance with the present invention, there is provided a linear pulse motor, comprising:

a primary side unit, including at least a pair of first and second electromagnets, each having at least a pair of magnetic pole portions spaced apart from each other;

a secondary side unit, including a number of inductor teeth arranged along a straight line at a predetermined pitch, said primary and secondary side units being arranged such that a predetermined gap is maintained between said pair of magnetic pole portions of the primary side unit and the inductor teeth of said secondary unit;

controlling means for controlling energization of said first and second electromagnets such that a relative motion is created between said primary and secondary side units; and wherein said primary side unit further includes adjusting means for adjusting a distance between said pair of first and second electromagnets in a longitudinal direction of said inductor teeth.

In accordance with another aspect of the present invention, there is provided a linear motion assembly including the above-described linear pulse motor and guiding means for guiding a relative motion between said primary and secondary side units.

It is therefore a primary object of the present invention to provide an improved linear pulse motor having an extremely high resolution.

Another object of the present invention is to provide an improved linear motion unit extremely high in resolution.

A further object of the present invention is to provide an improved magnetic positioning device.

Other objects, advantages and novel features of the present invention will become apparent from the following detailed description of the invention when considered in conjunction with the accompanying drawings.

DESCRIPTION OF THE PREFERRED EMBODIMENTS

Figure 1:
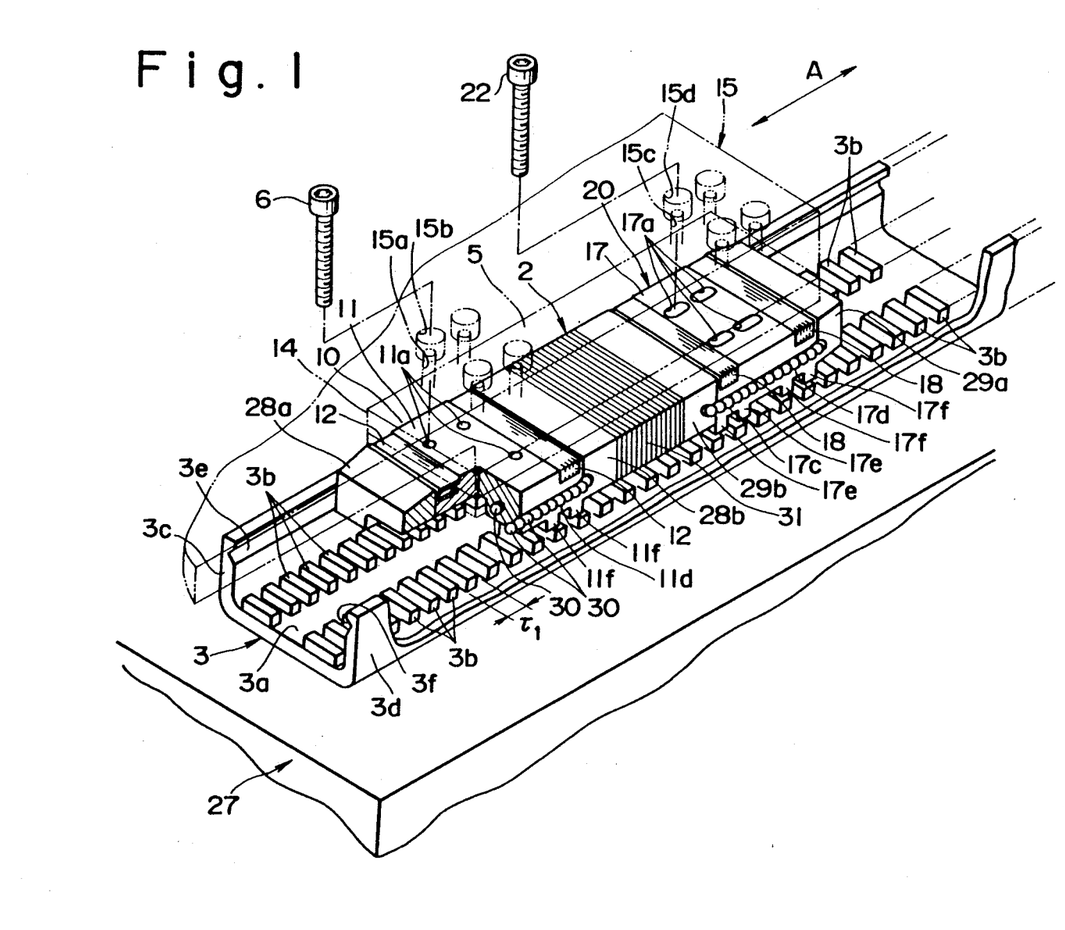
FIG. 1 is a schematic illustration showing a linear motion assembly including a linear pulse motor constructed in accordance with one embodiment of the present invention.
Figure 2:
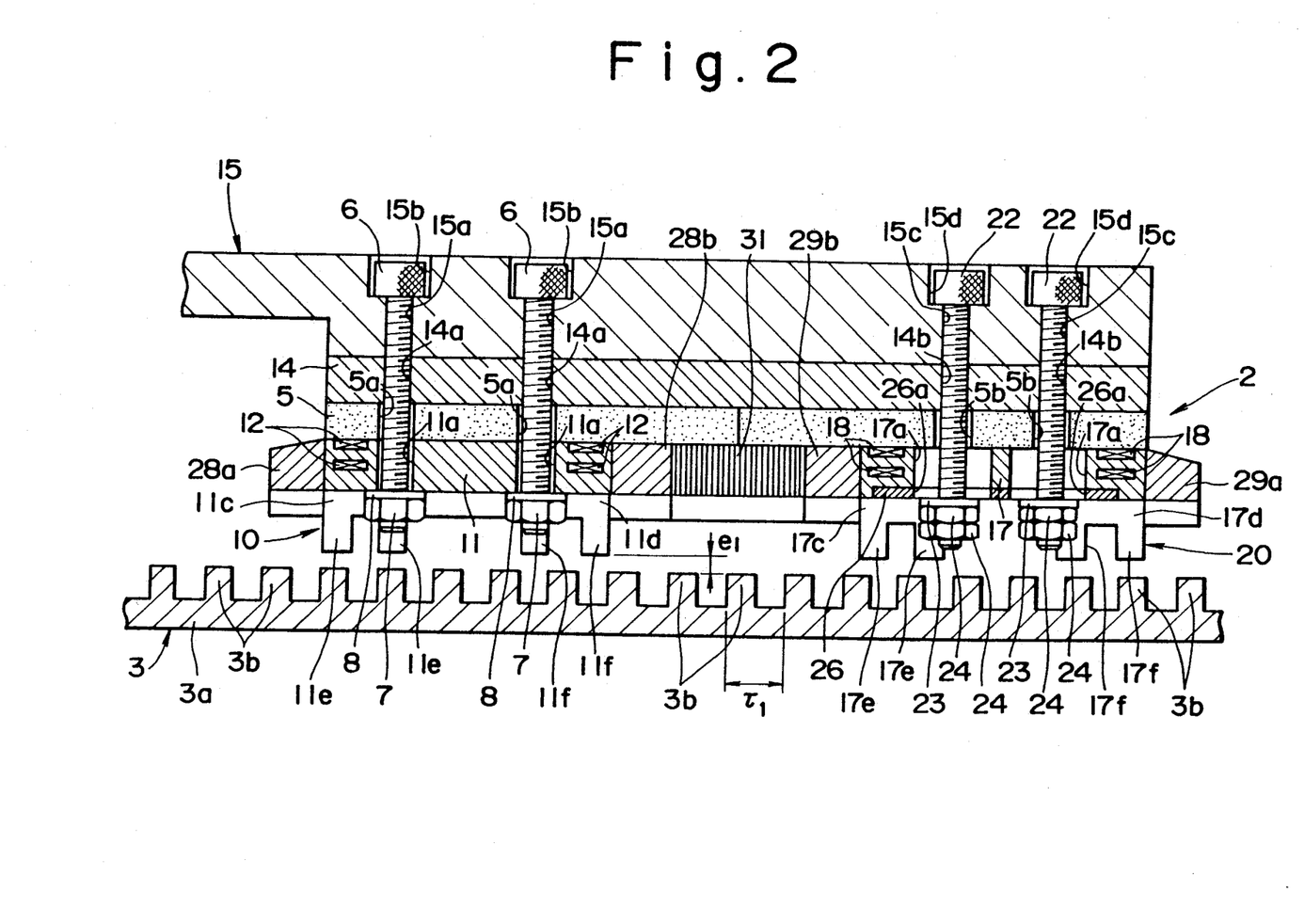
FIG. 2 is a schematic illustration showing in longitudinal cross section a part of the linear motion assembly of FIG. 1.

Referring now to FIGS. 1 and 2, there is schematically shown a linear pulse motor constructed in accordance with one embodiment of the present invention. The illustrated linear pulse motor is of the two phase excitation type and it generally includes a primary side unit 2 to which a pulse signal for displacement is supplied and a secondary side unit 3, which cooperates with the primary side unit 2 to produce thrust.

The primary side unit 2 includes a permanent magnet 5 generally in the shape of a rectangular plate. The primary side unit 2 also includes a first electromagnet 10 which is fixedly attached to the permanent magnet 5 at its bottom surface by means of four bolts 6 and associated nuts 7 and washers 8. An adhesive is preferably provided at an interface between the permanent magnet 5 and the first electromagnet 10. The first electromagnet 10 includes an iron core 11 and a coil 12 wound around the core 11. The bolts 6 extend through holes 5a and 11a provided in the permanent magnet 5 and the iron core 11, respectively.

A back plate 14 of a material having a high permeability is fixedly attached to the permanent magnet 5 at its top surface. The back plate 14 is in contact under pressure with one end of a table 15 having a rectangular shape by means of the bolts 6. The bolts 6 are screwed into threaded holes 15a and 14a provided in the table 15 and the back plate 14, respectively. The table 15 is formed with a counter-bore 15b at its top surface so as to receive therein a head portion of each of the bolts 6.

The primary side unit 2 also includes a second electromagnet 20 which is comprised of an iron core 17 and a coil 18 wound therearound and disposed below the permanent magnet 5 at an end opposite to the end where the first electromagnet 10 is disposed. Of importance, in the illustrated embodiment, the second electromagnet 20 is so provided that it can slidably move relative to the permanent magnet 5 and thus to the first electromagnet 10 in a longitudinal direction. Described more in detail in this respect, four bolts 22 are screwed into threaded holes 14b and 5b of the back plate 14 and the permanent magnet 5 and they extend through four slots 17a formed in the iron core 17, respectively. Each of the slots 17a extend with its longitudinal direction in parallel with the longitudinal direction of the table 15. Each of these bolts 22 has its bottom end portion extended below the associated slot 17a and a washer and two thin nuts 24 are screwed onto the bottom end portion.

A plate-shaped low friction coefficient member 26, for example, of a synthetic resin material is fixedly attached as buried in the bottom surface of the iron core 17 only with its bottom surface exposed and the washer 23 is smoothly slidably along the exposed bottom surface of the low friction coefficient member 26. A slot 26a similar to the slot 26a of iron core 17 is provided in the low friction coefficient member 26 and each of the bolts 22 extend through the associated slot 26a. Similarly with the bolts 6, the bolts 22 extend through the holes 5b provided in the permanent magnet 5 and screwed into the threaded holes 15c and 14b of the table 15 and the back plate 14, respectively. A counter-bore 15d is provided at the top surface of the table 15 so as to receive therein a head portion of each of the bolts 22.

The secondary side unit 3 is generally elongated in shape and has a U-shaped cross section. It is typically comprised of a material having a high permeability. A number of inductor teeth 3b are provided on a bottom wall 3a of the secondary side unit 3 arranged in two parallel, straight rows at a predetermined pitch $\tau_1$. The secondary side unit 3 is fixedly mounted on a bed 27 of a machining tool or the like, for example, by means of bolts. Regarding pitch $\tau_1$, if it is set to be a small value, for example, as disclosed in the Japanese Patent Laid-open Pub. No. 3-124254, then the accuracy in positioning an object can be increased.

As described above, the secondary side unit 3 is provided with a number of lower inductor teeth 3b. On the other hand, the two permanent magnets 10 and 20 of the primary side unit 2 are also each provided with similar inductor teeth. That is, the magnetic pole portions 11c, 11d, 17c and 17d extend downwardly from the respective iron cores 11 and 17 to thereby define upper inductor teeth 11e, 11f, 17e and 17f at their bottom ends. The primary and secondary side units 2 and 3 are so arranged that their upper and lower inductor teeth 3b and 11e, 11f, 17e and 17d are in an opposed relationship with a predetermined air gap $e_1$. As will be described later in detail, in the illustrated embodiment, the primary side unit 2 is slidably supported relative to the secondary side unit 3b by a guide means while keeping the predetermined gap $e_1$ therebetween. In the present embodiment, as shown in FIG. 1, the secondary side unit 3 includes a pair of left and right side walls 3c and 3d, which are formed with guide grooves 3e and 3f, respectively, extending in parallel with the longitudinal axis of the secondary side unit 3.

As best shown in FIG. 2, the primary side unit 2 also includes two pair of end blocks 28a-28b and 29a-29b which are located on the opposite ends of the iron cores 11 and 17 of the electromagnets 10 and 20, respectively. That is, the end blocks 28a and 28b are located on the opposite ends of the iron core 11 of electromagnet 10 and similarly the end blocks 19a and 29b are located on the opposite ends of the iron core 17 of electromagnet 20.

As can be seen from FIG. 1, the primary side unit 2 includes two pairs of endless circulating paths, each associated with one of the electromagnets 10 and 20. Each of the endless circulating paths includes a load path section, a return path section and a pair of curved connecting path sections, each connecting the corresponding ends of the load and return path sections as well known in the linear motion guide unit technology. As shown in FIG. 1, each of the iron cores 11 and 17 is provided with a load path section and a return path section on their opposite side surfaces. And, each of the end blocks 28a, 28b, 29a and 29b is provided with a pair of curved connecting path sections. Thus, the primary side unit 2 is provided with four endless circulating paths, each filled with a number of balls 30 as rolling members. The load path section is partly defined by a corresponding one of the guide grooves 3e and 3f of the secondary side unit 3. Thus, those balls 30 that are located in the load path sections provide a rolling contact between the primary and secondary side units 2 and 3 so that a linear relative motion can be provided between the primary and secondary side units 2 and 3.

As described above, in the illustrated embodiment, the secondary side unit 3 is so structured to serve as a U-shaped guide rail for guiding the linear motion of the primary side unit 2 which serves as a slider. In particular, in the illustrated embodiment, the endless circulating paths provided in the primary side unit 2 and the guide grooves 3e, 3f formed in the secondary side unit 3 define a guide means for guiding a relative linear motion between the primary and secondary side units 2 and 3. A linear motion assembly is defined as a combination between the above-described linear pulse motor and guide means. It is to be noted that although the endless circulating paths are provided partly in the magnetic cores in the above-described embodiment, they may be formed separately from the linear pulse motor structure and operatively coupled thereto, if desired. Similarly, the guide grooves 3e and 3f may be formed separately from the secondary side unit 3, if desired. However, the above-described embodiment having an integrated structure is advantageous in minimizing the number of parts.

As can be best seen from FIG. 2, the primary side unit 2 includes a first energizing section comprised of electromagnet 1 and its associated end blocks 28a and 28b, a second energizing section comprised of electromagnet 20 and its associated end blocks 29a and 29b, and a spacing adjusting means comprised of a piezoelectric element 21 and disposed between the first and second energizing sections as fixedly attached thereto, for example, by an adhesive agent. The piezoelectric element 31 is an element which converts electric energy to mechanical energy, such as displacement, force or the like. Thus, it can produce a physical displacement in any direction by application of electricity. In the present embodiment, a desired voltage may be applied to the piezoelectric element 31 through leads (not shown) to adjust the spacing or distance between the first and second energizing sections.

As shown in FIG. 1, the primary side unit 2 is fixedly attached to a table 15 and the secondary side unit 3 is fixedly attached to a bed 27 which is stationary in the illustrated embodiment. Thus, any desired object may be temporarily mounted on the table 15 by any fixing means and it may be positioned at a desired location or set in a reciprocating motion as indicated by arrow A. For example, a workpiece may be temporarily mounted on the table 15 which executes a reciprocating motion as indicated by arrow A during which the workpiece is subjected to an cutting operation by means of a stationary cutting tool fixedly mounted on the bed 27. In the above-described embodiment, although two sets of linear pulse motors are provided in a side-by-side relationship, use may be made of a single linear pulse motor, if desired. Besides, two sets of linear pulse motors may be arranged in a row.

Now, referring particularly to FIGS. 3 through 8, the operation of the linear motion assembly incorporating the above-described linear pulse motor will be described below. It is to be noted that reference characters 32 through 39 used in FIGS. 3 through 8 refer to selected individual teeth of inductor teeth 3b of the secondary side unit 3 shown in FIG. 1. For the purpose of clarity in the drawings, the inductor teeth of the magnetic pole portions 11c, 11d, 17c and 17d of the primary side unit 2 have been removed in FIGS. 3 through 8. In addition, reference characters S and N indicated above and below the permanent magnet 5 refer to the magnetic polarities of the permanent magnet 5.

Figure 3:
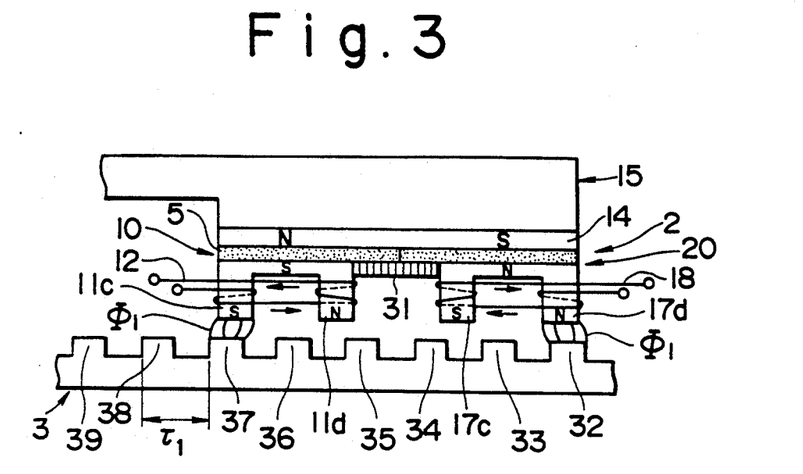
FIGS. 3-8 are schematic illustrations useful for explaining the principle of operation of the linear motion assembly shown in FIG. 1.

It is assumed that FIG. 3 shows the initial state in which current flows through the coils 12 and 18 of electromagnets 10 and 20, respectively, of the primary side unit 2 in the directions indicated by the arrows so that a strong magnetic flux $\Phi_1$, which is a sum of the magnetic flux due to the permanent magnet 5 and the magnetic flux due to the coil 12 or 18, is present between the magnetic pole portion 11c and the inductor tooth 37 and between the magnetic pole portion 17d and the inductor tooth 32. On the other hand, the magnetic attractive force is weaker between the magnetic pole portion 11d and its associated inductor tooth of the secondary side unit 3 and also between the magnetic pole portion 17c and its associated inductor tooth of the secondary side unit 3 because of the subtractive nature between the magnetic flux due to the permanent magnet 5 and each of the associated coils 11d and 17c. Such a weak magnetic attractive force can be set to be substantially zero, if desired.

Figure 4:
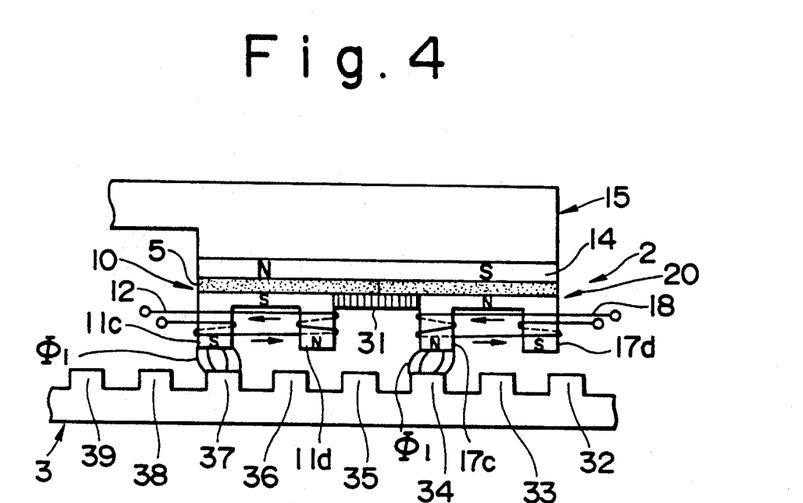

Now, when the current flowing in the coil 18 has been reversed in direction, the polarities of electromagnet 20 are reversed as shown in FIG. 4. As a result, a strong magnetic flux $\Phi_1$ is now generated between the magnetic pole portion 17c and its associated inductor tooth 34 while the strong magnetic flux $\Phi_1$ disappears between the magnetic pole portion 17d and the inductor tooth 32. Accordingly, because of the magnetic attractive force acting between the magnetic pole portion 17c and the inductor tooth 34, together with the magnetic attractive force acting between the magnetic pole portion 11c and the inductor tooth 37, the primary side unit 2 and thus the table 15 moves relative to the secondary side unit 3 over a distance corresponding to ¼ of pitch $\tau_1$.

Figure 5:
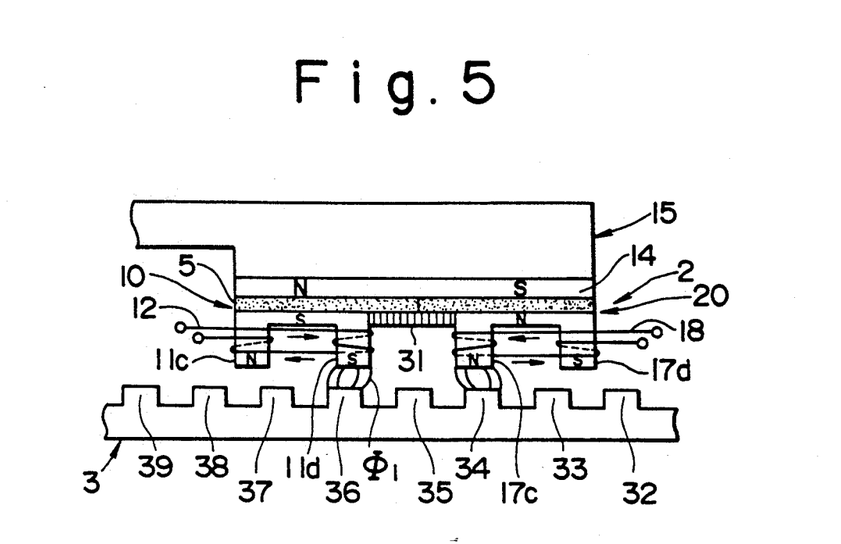

Then, as shown in FIG. 5, when the direction of the current flowing in the coil 12 is reversed so that the polarities of electromagnet 10 are reversed, a strong magnetic flux is produced between the magnetic pole portion 11d and its adjacent inductor tooth 36 and the strong magnetic flux which was present between the magnetic pole portion 11c and the inductor tooth 37 disappears. Thus, due to the magnetic attractive forces acting between the magnetic pole portion 17c and the inductor tooth 34 and between the magnetic pole portion 11d and the inductor tooth 36, the table 15 moves over a distance corresponding to another ¼ of the pitch.

Figure 6:
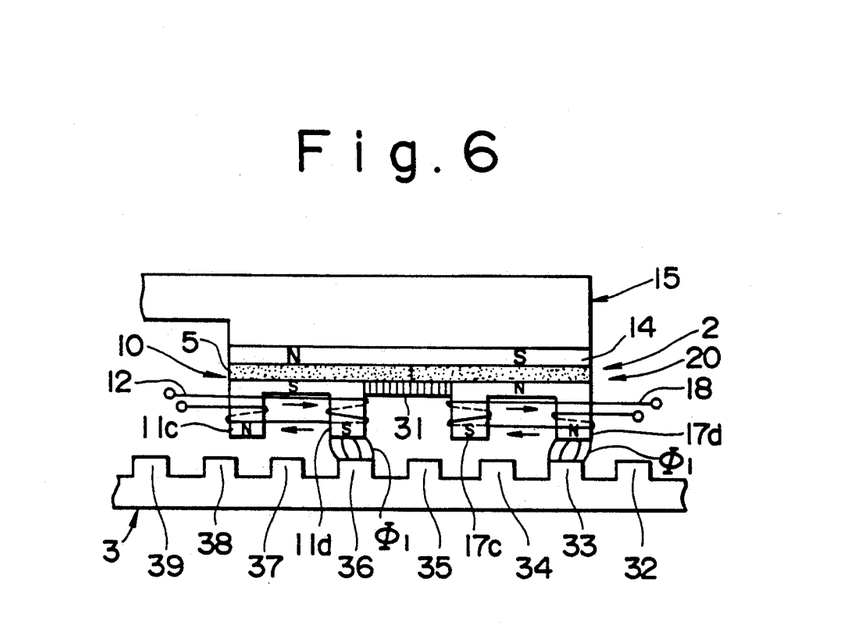

Then, as shown in FIG. 6, the direction of the current flowing in the coil 18 is again reversed to reverse the magnetic polarities of electromagnet 20 so that a strong magnetic flux $\Phi_1$ is now produced between the magnetic pole portion 17d and its adjacent inductor tooth 33 while the strong magnetic flux which was present between the magnetic pole portion 17c and the inductor tooth 34 now disappears. As a result, because of magnetic attractive forces acting between the magnetic pole portion 17d and its associated inductor tooth 11d and also between the magnetic pole portion 11d and its associated inductor tooth 36, the table 15 further advances over a distance corresponding to a further ¼ of the pitch. Thereafter, the directions of the current flowing in the coils 18 and 21 are set as shown in FIG. 3 so that the table 15 executes a further advancement over a distance corresponding to a still further ¼ of the pitch.

In this manner, the table 15 has completed one cycle of operation to move over a distance corresponding to pitch $\tau_1$. The above-described cycle of operation may be repeated as many times as desired so as to locate the table 15 at a desired location. Although the table 15 moved to the left in the above-described example, the table 15 may be moved to the right, if desired. Besides, although the primary side unit 2 was a moving unit and the secondary side unit 3 was a stationary unit in the above-described embodiment, their roles may be reversed or both of them may be constructed to be movable with reference to a separate stationary reference.

Figure 7A:
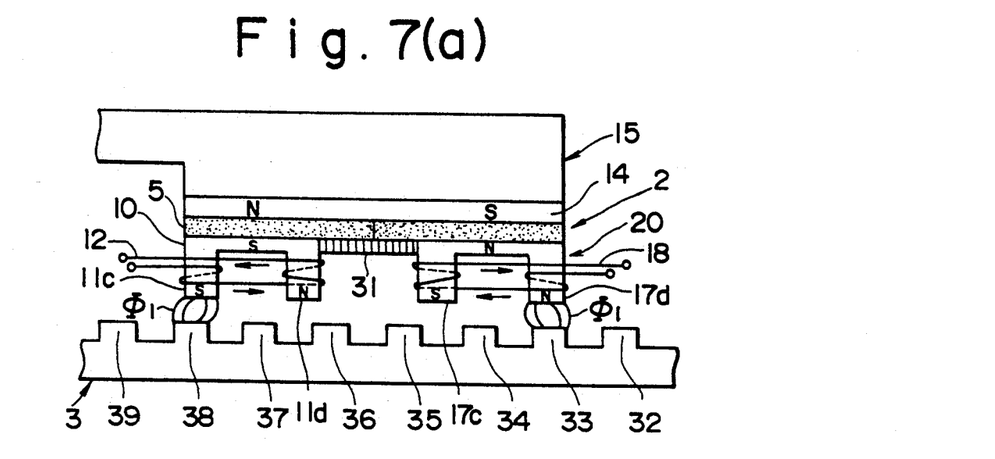
Figure 7B:
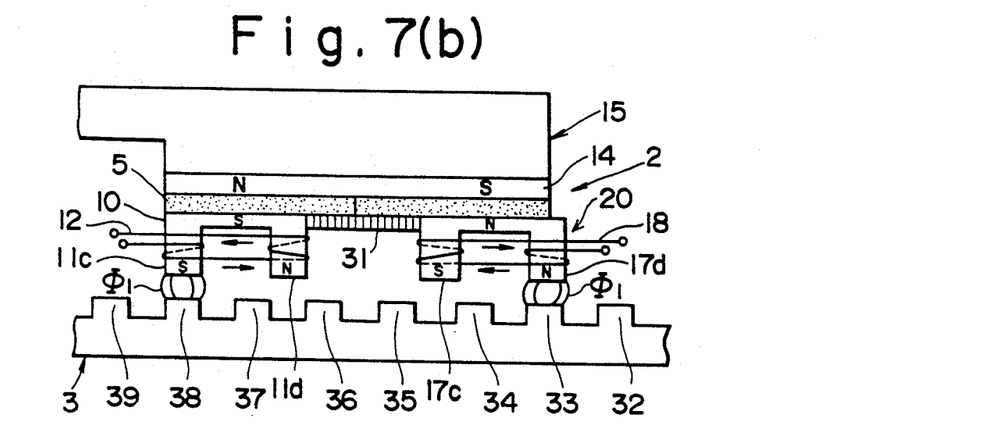
Figure 7C:
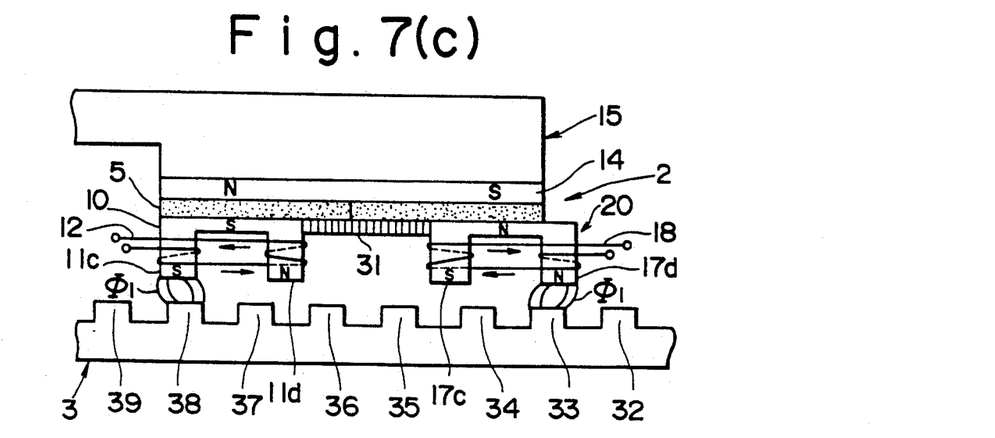

The above-described operation completes the so-called coarse positioning operation. Upon completion of such a coarse positioning operation, in accordance with the present invention, a desired voltage is applied to the piezoelectric element 31 so as to change the distance or spacing between the first and second energizing sections or electromagnets 10 and 20. As an example, as shown in FIGS. 7(a)-(c), when a selected voltage is applied to the piezoelectric element 31, the element 31 expands or becomes elongated over a desired distance so that the second electromagnet 20 becomes displaced further away from the first electromagnet 10 as shown in FIG. 7(b). This is possible because the second electromagnet 20 is slidably mounted on the permanent magnet 5 as described before in connection with FIG. 2.

As described before with reference to FIG. 2, since the electromagnet 10 (first energizing section) is fixedly attached to the table 15, the table 15 moves to the left over a distance half of the amount of expansion or elongation of the piezoelectric element 31. In this manner, fine positional adjustments of the table 15 can be carried out by applying a selected voltage to the piezoelectric element 31 so as to position the table 15 at a desired location at high accuracy.

Figure 8:
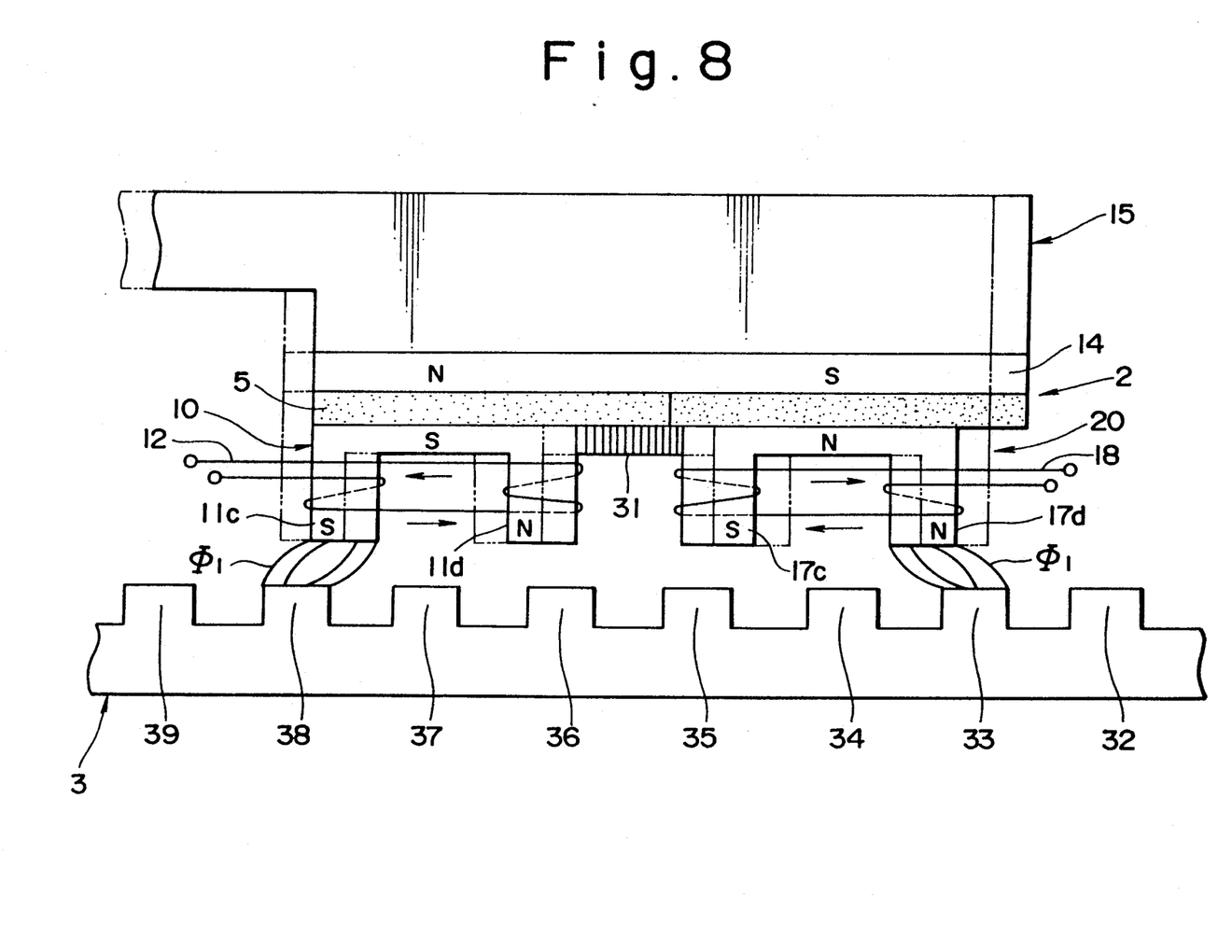

FIG. 8 illustrates a case in which a selected voltage is applied to the piezoelectric element 31 to have it contracted to carry out fine positional adjustments of the table 15. It should thus be apparent for one skilled in the art that the amount of such fine positional adjustments can be easily determined by the magnitude of a voltage applied to the piezoelectric element 31.

Figure 9:
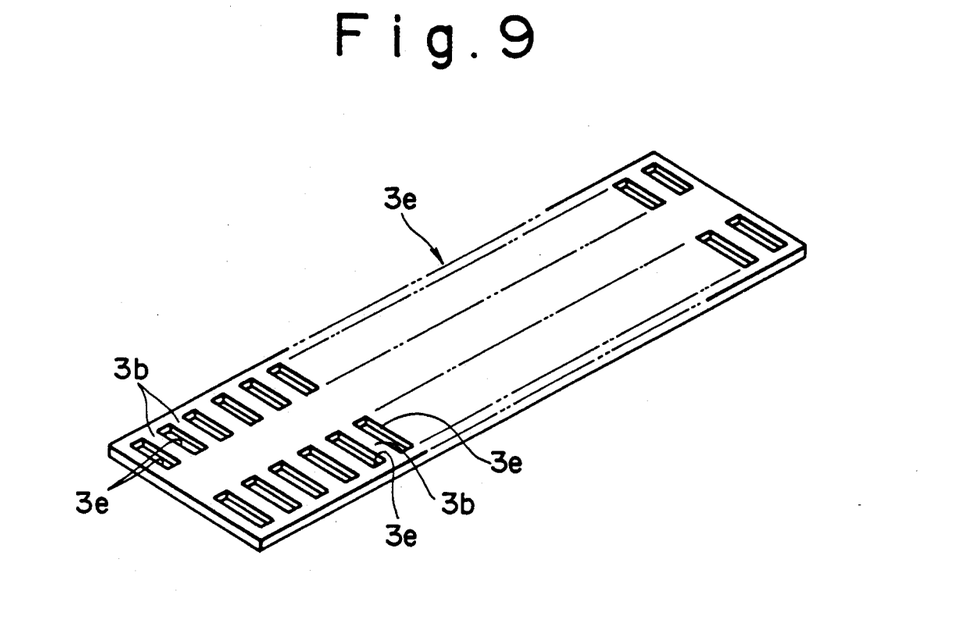
FIG. 9 is a schematic illustration showing in perspective view a secondary side unit according to an alternative embodiment of the present invention.

FIG. 9 illustrates a modified secondary side unit 3 constructed in accordance with another embodiment of the present invention. In the embodiment shown in FIGS. 1 and 2, the secondary side unit 3 is generally constructed in the shape of a trough and a number of inductor teeth 3b are provided as projections at its bottom surface 3a in two rows. On the other hand, in the modified structure shown in FIG. 9, a plate 3e of a material having a high permeability, such as soft iron, is fabricated separately. The plate 3e is formed with a number of rectangular holes 3f in two rows, for example, by etching. The plate 3e is then fixedly attached to the bottom wall of a trough-shaped guide rail. Thus, a section between two adjacent holes 3f define an inductor tooth 3b. With this embodiment, the secondary side unit 3 can be manufactured with ease.

Figure 10:
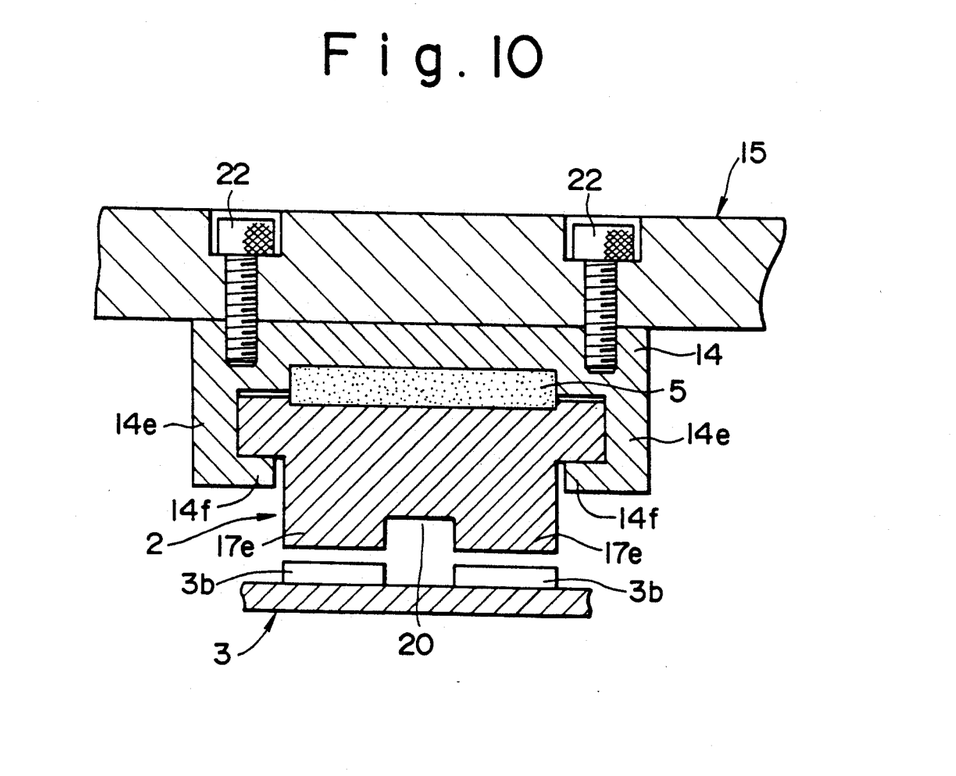
FIG. 10 is a schematic illustration showing in transverse cross section the main portion of a linear motion assembly constructed in accordance with another embodiment of the present invention.

FIG. 10 illustrates a linear motion assembly constructed in accordance with another embodiment of the present invention. Since the structure shown in FIG. 10 is similar in many respects to the above-described embodiment shown in FIGS. 1 through 9, it should be understood that those portions that are not shown specifically in FIG. 10 are constructed similarly with the above-described embodiment. In addition, those elements which are similar or identical to those elements shown in FIGS. 1 through 9 are indicated by like reference characters.

As shown in FIG. 10, in the present embodiment, the back plate 14 interposed between the primary side unit 2 and the table 15 includes a pair of depending sections 14e, each formed with an inwardly projecting support section 14f from the bottom end thereof. Thus, the primary side unit 2 is held in position by means of these depending and support sections 14e and 14f. Regarding the electromagnet 10, it is fixedly attached to the permanent magnet 5 and thus to the table 15, for example, by an adhesive agent (see FIGS. 1 and 2); whereas, the second energizing unit or electromagnet 20 is mounted slidably relative to the permanent magnet 5 and thus to the table 15 by means of the depending sections 14e and the support sections 14f.

With the structure of the embodiment shown in FIG. 10, bolts 6 and 22 may be made shorter since they are only required to be used for tightening between the table 15 and the back plate 14. Besides, since these bolts do not extend below the bottom surface of the second side unit 2, there is no leakage of magnetic flux through these bolts.

In the above-described embodiments, use has been made of the two phase excitation system for the PM type linear pulse motor; however, use may also be made of a single phase or multi-phase (three phase or more) PM type linear pulse motor. Furthermore, use may also be made of a VR type linear pulse motor having no permanent magnet. In addition, although use has been made of a piezoelectric element as a means for adjusting the spacing or distance between the first and second energizing sections or electromagnets 10 and 20, use may also be made of any other specific elements as long as expansion or contraction can be produced by application of a selected signal such as a voltage. For example, magnetostrictive elements can be used and alternatively use may also be made of a small-sized motor for that purpose. Besides, in the above-described embodiments, use has been made of a mechanical structure as a guiding means for guiding a relative motion between the primary and secondary side units 2 and 3; however, use may also be made of any other means as long as a relative motion can be provided between the primary and secondary side units 2 and 3. For example, use may also be made of pressure of fluid, such as air or oil, or magnetic forces so as to lift one of the primary and secondary side units 2 and 3 relative to the other.

While the above provides a full and complete disclosure of the preferred embodiments of the present invention, various modifications, alternate constructions and equivalents amy be employed without departing from the true spirit and scope of the invention. Therefore, the above description and illustration should not be construed as limiting the scope of the invention, which is defined by the appended claims.

What is claimed is:

1. A linear pulse motor, comprising:
 a primary side unit, including at least a pair of first and second electromagnets, each having at least one magnetic pole portion;
 a secondary side unit, including a number of inductor teeth arranged along a straight line at a predetermined pitch, said primary and secondary side units being arranged such that a predetermined gap is maintained between said magnetic pole portions of the primary side unit and the inductor teeth of said secondary side unit;
 controlling means for controlling energization of said first and second electromagnets such that a relative motion is created between said primary and secondary side units; and
 wherein said primary side unit further includes adjusting means for adjusting a distance between said magnetic pole portion of said first electromagnet and said magnetic pole portion of said second electromagnet in a longitudinal direction of said inductor teeth.

2. A linear pulse motor of claim 1, wherein said adjusting means includes a piezoelectric element.

3. A linear pulse motor of claim 2, wherein said primary side unit includes a permanent magnet for applying a fixed magnetic flux to each of said magnetic pole portions at all times.

4. A linear motion assembly, comprising:
a primary side unit, including at least a pair of first and second electromagnets, each having at least one magnetic pole portion;
a secondary side unit, including a number of inductor teeth arranged along a straight line at a predetermined pitch, said primary and secondary side units being arranged such that a predetermined gap is maintained between said magnetic pole portions of the primary side unit and the inductor teeth of said secondary side unit;
controlling means for controlling energization of said first and second electromagnets such that a relative motion is created between said primary and secondary side units;
guiding means for guiding a relative motion between said primary and secondary side units; and
wherein said primary side unit further includes adjusting means for adjusting a distance between said magnetic pole portion of said first electromagnet and said magnetic pole portion of said second electromagnet in a longitudinal direction of said inductor teeth.

5. A linear motion assembly of claim 2, wherein said primary side unit includes an elongated rail having a bottom wall and a pair of side walls upstanding from opposite sides of said bottom wall, said induction teeth being formed as projections of said bottom wall.

6. A linear motion assembly of claim 5, wherein said guiding means includes a pair of guide grooves formed in said side walls of said rail, at least two endless circulating paths provided in said primary side unit, one associated with a corresponding one of said pair of guide grooves, and a plurality of rolling members provided in each of said endless circulating paths.

* * * * *